(12) United States Patent
Sun et al.

(10) Patent No.: US 12,252,191 B2
(45) Date of Patent: Mar. 18, 2025

(54) STEERING CONTROL DEVICE AND METHOD

(71) Applicant: HL MANDO CORPORATION, Pyeongtaek-si (KR)

(72) Inventors: TaeHyung Sun, Gyeonggi-do (KR); Tae Sik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 250 days.

(21) Appl. No.: 17/952,320

(22) Filed: Sep. 26, 2022

(65) Prior Publication Data

US 2023/0100164 A1    Mar. 30, 2023

(30) Foreign Application Priority Data

Sep. 29, 2021   (KR) .......................... 10-2021-0129121

(51) Int. Cl.
*B60W 10/20*   (2006.01)
*B62D 5/04*    (2006.01)
*B62D 6/00*    (2006.01)

(52) U.S. Cl.
CPC ......... *B62D 5/0484* (2013.01); *B62D 5/0469* (2013.01); *B62D 6/007* (2013.01)

(58) Field of Classification Search
CPC .... B60W 10/20; B62D 5/0484; B62D 5/0493
See application file for complete search history.

(56) References Cited

U.S. PATENT DOCUMENTS

| | | | |
|---|---|---|---|
| 2003/0079933 A1* | 5/2003 | Chabaan | B62D 5/0463 180/443 |
| 2019/0047618 A1* | 2/2019 | Hultén | B60W 10/30 |
| 2020/0076343 A1* | 3/2020 | Zhang | H02P 23/12 |
| 2020/0277005 A1* | 9/2020 | Loussaut | B62D 5/0463 |
| 2020/0346688 A1* | 11/2020 | Otto | B60W 50/045 |
| 2020/0391793 A1* | 12/2020 | Loussaut | G01L 5/221 |
| 2022/0388569 A1* | 12/2022 | Uchino | B62D 5/006 |
| 2022/0396308 A1* | 12/2022 | Lee | B62D 5/0484 |

* cited by examiner

*Primary Examiner* — Long T Tran
(74) *Attorney, Agent, or Firm* — WOMBLE BOND DICKINSON (US) LLP

(57) ABSTRACT

The embodiments relates to a steering control device and method. Specifically, a steering control device according to the embodiments may include a first steering control module receiving a steering angle of a steering wheel from a steering angle sensor, calculating a position of a rack corresponding to the steering angle, and transmitting the position of the rack to a road wheel actuator (RWA) and a second steering control module to which a control right for the first steering control module is transferred when the first steering control module is determined to have a failure.

16 Claims, 7 Drawing Sheets

STEERING CONTROL DEVICE AND METHOD

CROSS-REFERENCE TO RELATED APPLICATION

This application claims priority from Korean Patent Application No. 10-2021-0129121, filed on Sep. 29, 2021, which is hereby incorporated by reference for all purposes as if fully set forth herein.

BACKGROUND

Field

The present embodiments relate to a steering control device and method.

Description of Related Art

A conventional vehicle steering device is a device for the driver to choose the vehicle's traveling direction and perform manipulation and includes a steering wheel, which is directly manipulated by the driver, and a steering mechanism for transferring the handling direction and force of the steering wheel to the vehicle wheels.

Power steering devices have been developed and applied to provide driving convenience in aid of the handling force of the steering wheel and include hydraulic types using hydraulic pressure, electric-hydraulic types using both hydraulic pressure and motor electromotive force, and electric types using motor electromotive force alone, which have been sequentially developed and applied. Electric types which use only motor electromotive force include, e.g., steer-by-wire types.

Among steer-by-wire types of systems, electronic steering systems draw attention which adopt a redundant system to control vehicle steering by way of two or more electronic control units (ECUs), rather than conventional single-ECU systems. In the redundant system, when one ECU fails to properly work due to physical damage or errors, the other ECU takes place, enhancing steering stability.

BRIEF SUMMARY

The above and other objects, features, and advantages of the disclosure will be more clearly understood from the following detailed description, taken in conjunction with the accompanying drawings, in which:

In the foregoing background, the disclosure provides a steering control device and method that changes the driving mode or transfers control right depending on the driving mode of the host vehicle or the faulty part.

To achieve the foregoing objectives, in an aspect, the disclosure provides a steering control device comprising a first steering control module receiving a steering angle of a steering wheel from a steering angle sensor, calculating a position of a rack corresponding to the steering angle, and transmitting the position of the rack to a road wheel actuator (RWA) and a second steering control module to which a control right for the first steering control module is transferred when the first steering control module is determined to have a failure.

In another aspect, the disclosure provides a steering control method comprising a driving mode determination step determining a driving mode in which a host vehicle is driving, a rack position calculation step receiving a steering angle of a steering wheel from a steering angle sensor to calculate a position of a rack corresponding to the steering angle when the host vehicle is driving in a driver mode and, when the host vehicle is driving in an autonomous vehicle mode, receiving vehicle ambient information from a plurality of sensors to calculate the position of the rack according to an ambient context of the host vehicle based on the vehicle ambient information and, upon determining that a first steering control module calculating the position of the rack has a failure, transferring a control right for the first steering control module to a second steering control module, and a rack position transmission step transmitting the calculated position of the rack to a road wheel actuator (RWA).

According to the disclosure, the steering control device and method transfers the control right depending on the driving mode and faulty part in the driving vehicle corresponding to autonomous driving levels 3, 4, and 5.

DETAILED DESCRIPTION

Figure 1:
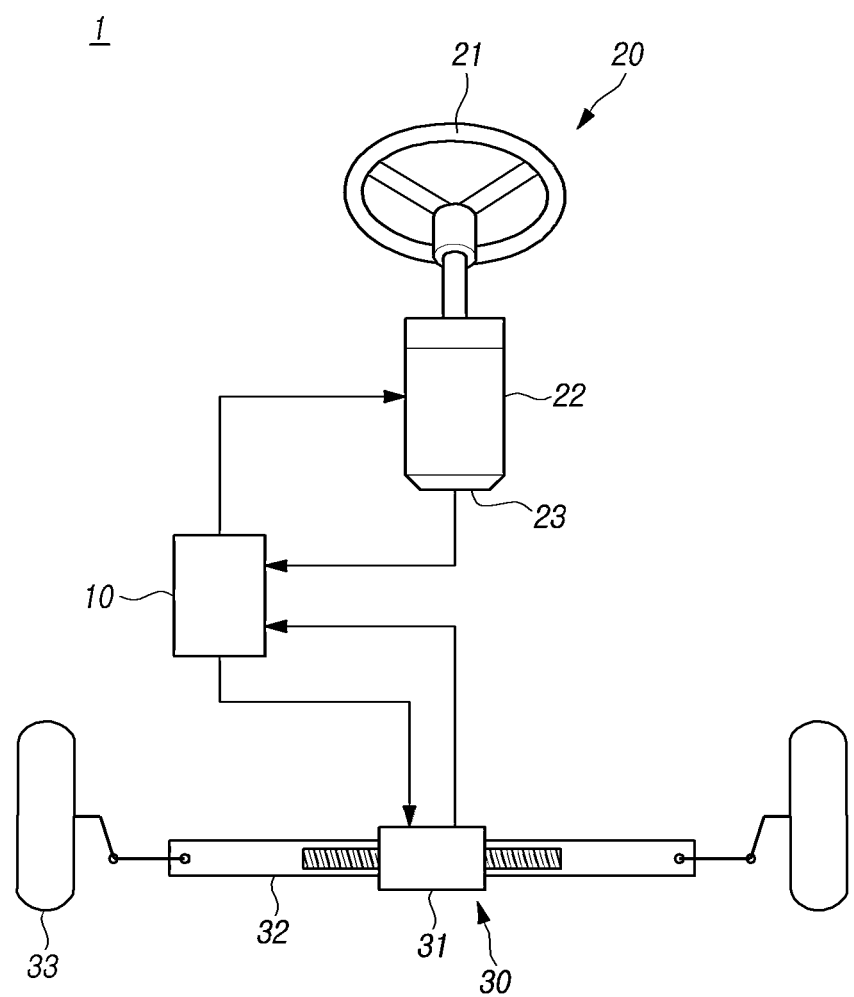
FIG. 1 is a view schematically illustrating a steering control system according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, an embodiment of a steering control system 1 that may perform the function of a steering control device 10 and the function of controlling the steering of the host vehicle is described.

FIG. 1 is a view schematically illustrating a steering control system 1 according to an embodiment.

Referring to FIG. 1, the steering control system 1 according to an embodiment may mean a system to control the steering of the host vehicle equipped with the steering control system 1 to be changed according to the rotation angle of the steering wheel manipulated by the driver.

The steering control system 1 may refer to an electronic power steering (EPS) that provides steering assistance power by driving a motor. The following description focuses primarily on the electronic steering control system 1, but the disclosure is not limited thereto.

The linkage between the steering input actuator 20 and the steering output actuator 30 may be a steer-by-wire (SbW) system that transfers power by transmitting/receiving electrical signals via wires or cables in place of a mechanical power transfer device. An example in which the steering control system 1 is an SbW system is described below, but the disclosure is not limited thereto.

The steering control system 1 according to the disclosure, as shown in FIG. 1, may include a steering control device 10, a steering input actuator 20, and a steering output actuator 30. As described above, if the steering control system 1 is an SbW system, the steering input actuator 20 and the steering output actuator 30 may be mechanically separated from each other.

The steering input actuator 20 may mean a device to which steering information intended by the driver is inputted. As described above, the steering input actuator 20 may include a steering wheel 21, a steering shaft 22, and a reaction force motor 23. Although not shown, the steering angle information may further include a steering gear for transferring the rotational force of the reaction force motor 23 to the steering shaft 22.

The reaction force motor 23 may receive a control signal (or referred to as a 'command current') from the steering controller 10 and apply a reaction force to the steering wheel 21. Specifically, the reaction force motor 23 may receive a command current from the steering control device 10, drive at a rotation speed indicated by the command current to generate reaction torque, and transfer the generated reaction torque to the steering wheel through the steering gear.

The steering control device 10 may receive steering information from the steering input actuator 20, calculate a control value, and output an electrical signal indicating the control value to the steering output actuator 30. The steering information may mean information including at least one of a steering angle or driver's torque. The steering input actuator 20 may include sensors therefor. For example, the steering input actuator 20 may include a steering angle sensor for detecting the steering angle of the steering wheel and a torque sensor for detecting the driver's torque.

Meanwhile, the steering control device 10 may receive, as feedback, power information actually output from the steering output actuator 30, calculate a control value, and output an electrical signal indicating the control value to the steering input actuator 20, providing the driver with a steering sensation (steering feeling). In other words, the steering output actuator 30 may receive the position of the rack corresponding to the target steering angle from the steering control device 10 and may control the rack to move to the position.

The steering output actuator 30 may mean a device that actually drives the steering of the host vehicle. The steering output actuator 30 may include a steering motor 31, a rack 32, a wheel 33, a vehicle velocity sensor, and a rack position sensor.

The steering input actuator 20 and the steering output actuator 30 may further include a motor torque sensor capable of detecting the motor torque of the reaction force motor 23 and the steering motor 31.

The steering motor 31 may axially move the rack 32. Specifically, the steering motor 31 may receive a command current from the steering controller 10 and thus drive, and may allow the rack 32 to linearly move in the axial direction. Here, the command current may include the position of the rack calculated by the steering controller 10.

As driven by the steering motor 31, the rack 32 may perform a linear motion which allows the wheels 33 to turn to the left or right.

Although not shown, the steering control system 1 according to the disclosure may further include, e.g., a clutch for separating or connecting the steering input actuator 20 and the steering output actuator 30. The clutch may be operated by the control of the steering control device 10.

If the steering control system 1 according to the disclosure is an SbW system, and the host vehicle travels in an autonomous vehicle mode, the steering control system 1 according to the disclosure may control only the steering output actuator 120 to perform steering control on the host vehicle or may control both the steering input actuator 110 and the steering output actuator 120 to perform steering control on the host vehicle.

A steering control device 10 is described below with reference to the accompanying drawings, according to an embodiment of the disclosure.

Figure 2:
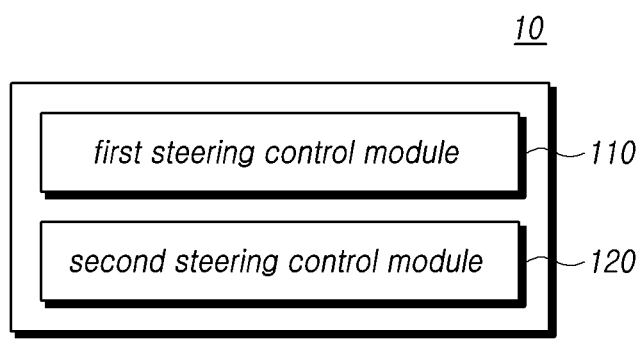
FIG. 2 is a block diagram illustrating an steering control device according to an embodiment of the disclosure.

FIG. 2 is a block diagram illustrating a steering control device 10 according to an embodiment of the disclosure.

The steering control device 10 according to an embodiment of the disclosure may include a first steering control module 110 and a second steering control module 120.

The first steering control module 110 may receive the steering angle of the steering wheel from the steering angle sensor, calculate the position of the rack corresponding to the steering angle, and transmit the position of the rack to the steering output actuator 30.

When the first steering control module 110 is determined to have a failure, the control right of the first steering control module may be transferred to the second steering control module 120.

Figure 3:
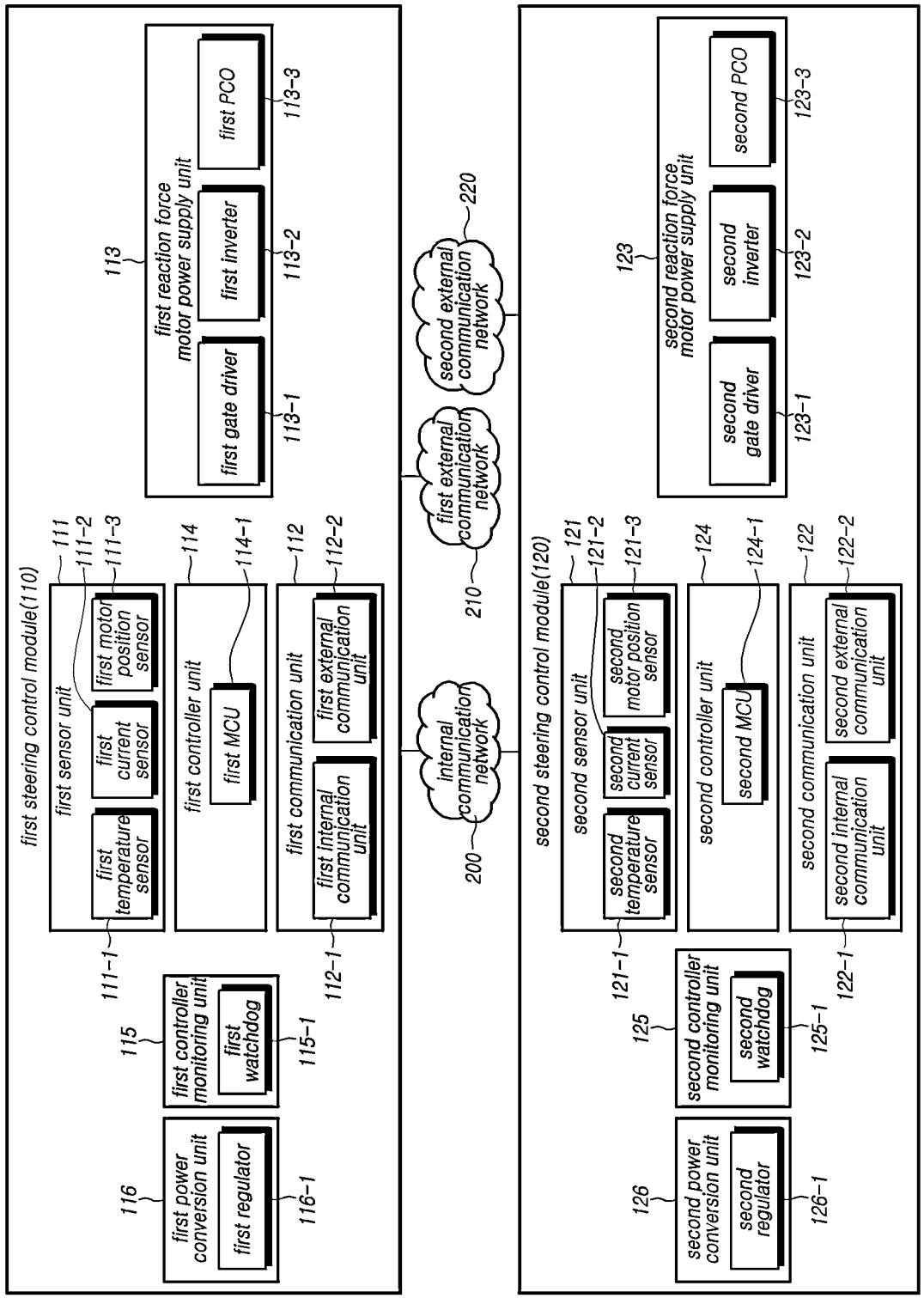
FIG. 3 is a block diagram illustrating, in greater detail, an steering control device according to an embodiment of the disclosure.

FIG. 3 is a block diagram illustrating, in greater detail, a steering control device 10 according to an embodiment of the disclosure.

Referring to FIG. 3, the steering control device 10 according to the disclosure may include a first steering control module 110 and a second steering control module 120. The first steering control module 110 may include a first sensor unit 111, a first communication unit 112, a first steering motor power supply unit 113, a first controller unit 114, and a first controller monitoring unit 115, and a first power conversion unit 116.

The second steering control module 120 may include a second sensor unit 121, a second communication unit 122, a second steering motor power supply unit 123, a second controller unit 124, a second controller monitoring unit 125, and a second power conversion unit 126.

In particular, the first sensor unit 111, the first communication unit 112, the first steering motor power supply unit 113, the first controller unit 114, the first controller monitoring unit 115, and the first power conversion unit 116 of the first steering control module 110 are identical to the second sensor unit 121, the second communication unit 122, the second steering motor power supply unit 123, the second controller unit 125, and the second power conversion unit 126, respectively. Thus, for brevity of description, the following description focuses primarily on components of the first steering control module 110.

The first sensor unit 111 may include, but is not limited to, a first temperature sensor 111-1, a first current sensor 111-2, and a first motor position sensor 111-3 but, without limitations thereto, may include any sensor capable of measuring the state for the vehicle steering device.

The first temperature sensor 111-1 may measure the temperature of the first steering control module 110. The first temperature sensor 111-1 may obtain first temperature information based on the measured temperature of the first steering control module 110. The first temperature sensor 111-1 may be connected to the first controller unit 114. The first temperature sensor may provide the obtained first temperature information to the first controller unit 114.

The first current sensor 111-2 may measure a first assist current between the first steering motor power supply unit 113 and the reaction force motor 23. The first current sensor 111-2 may obtain first assist current information based on the measured first assist current. The first current sensor 111-2 may be connected to the first controller unit 114. The first current sensor 111-2 may provide the obtained first assist current information to the first controller unit 114.

The first motor position sensor 111-3 may measure the position of the reaction force motor 23. The first motor position sensor 111-3 may obtain first motor position information based on the measured position of the reaction force motor 23. The first motor position sensor 111-3 may be connected to the first controller unit 114. The first motor position sensor 111-3 may provide the obtained first motor position information to the first controller unit 114.

The first communication unit 112 may include a first internal communication unit 112-1 and a first external communication unit 112-2.

The first internal communication unit 112-1 may be connected to the second internal communication unit 122-1 of the second steering control module 120 through an internal communication network 200. In other words, the first internal communication unit 112-1 and the second internal communication unit 122-1 may be connected to each other through the internal communication network 200, transmitting/receiving information to/from the first steering control module 110 and the second steering control module 120.

The first internal communication unit 112-1 may be connected to the first controller unit 114. In other words, the first internal communication unit 112-1 may provide the information (e.g., operation state information about the second steering control module 120) received from the second steering control module 120 to the first controller unit 114 through the internal communication network 200. The first internal communication unit 112-1 may provide the information (e.g., operation state information about the first steering control module 110) received from the first controller unit 114 to the second internal communication unit 122-1 through the internal communication network 200. The internal communication network 200 may be implemented through a private CAN scheme.

The first external communication unit 112-2 may be connected to the vehicle through the first external communication network 310. In other words, the first external communication unit 112-2 and the vehicle may be connected to each other through the first external communication network 310 and may transmit/receive information about the first steering control module 110 and the vehicle to/from each other. For example, the first external communication unit 112-2 may provide the information (e.g., vehicle state information) provided from the vehicle to the first controller unit 114 through the first external communication network 310. The first external communication unit 112-2 may provide the information (e.g., operation state information about the first steering control module 110) provided from the first controller unit 114 to the vehicle through the first external communication network 310.

The first internal communication unit 112-1 and the second external communication unit 112-2 may include at least one of wired and wireless communicators. In particular, the first internal communication unit 112-1 and the second external communication unit 112-2 may include a control area network (CAN) communicator but, without limitations thereto, may include any communicator capable of connecting each steering control module with the vehicle.

The first steering motor power supply unit 113 may include a first gate driver 113-1, a first inverter 113-2, and a first phase disconnector (PCO) 113-3.

The first gate driver 113-1 may be connected to the first controller unit 114. The first gate driver 113-1 may receive a first gate signal from the first controller unit 114. The first gate driver 113-1 may be connected to the first inverter 113-2. The first gate driver 113-1 may provide the first gate signal received from the first controller unit 114 to the first inverter 113-2.

The first inverter 113-2 may be connected to a voltage supply module. The first inverter 113-2 may receive a first DC voltage from the voltage supply module. The first inverter 113-2 may be connected to the first gate driver 113-1. The first inverter 113-2 may receive a first gate signal from the first gate driver 113-1. The voltage supply module may supply a voltage to operate the reaction force motor 23.

The first inverter 113-2 is a DC-AC converter and may modulate the first DC voltage provided from the voltage supply module according to the first gate signal provided from the first gate driver 113-1 to generate a first assist current.

The first inverter 113-2 may include a three-phase inverter, but without limitations thereto, be modified depending on the steering motor and power source.

The first phase cut off circuit (PCO) 113-3 may be connected to the first inverter 113-2. The first PCO 113-3 may receive the first assist current from the first inverter 113-2.

The first PCO 113-3 may supply or cut off the first assist current received from the first inverter 113-2 through an on-off operation. In other words, the first PCO 113-3 may be connected to the reaction force motor 23. The first PCO 113-3 may supply or cut off the first assist current received from the first inverter 113-2 to the reaction force motor 23.

The PCO is an element or circuit capable of cutting off a phase, and may include at least one of a switch, a circuit breaker, or a disconnecting switch but, without limitations thereto, may include any element or circuit that may cut off a phase.

As described above, the vehicle steering control device according to the disclosure may share one steering motor through each PCO, thereby separating each inverter through each PCO and hence increasing the redundancy and reliability of the vehicle.

The first controller unit 114 may be connected to the first sensor unit 111, the first communication unit 112, the first steering motor power supply unit 113, the first controller monitoring unit 115, and the first power conversion unit 116. The first controller unit 114 may control the operations of the first sensor unit 111, the first communication unit 112, the first steering motor power supply unit 113, the first controller monitoring unit 115, and the first power conversion unit 116.

For example, the first controller unit 114 may generate a first gate signal based on the steering wheel torque information received from at least one torque sensor, steering wheel steering angle information received from at least one steering angle sensor, the first temperature information, first assist current information and first motor position information received from the first sensor unit 111, and the vehicle state information (e.g., vehicle velocity information) received from the first communication unit 112 and provide the generated first gate signal to the first gate driver 113-1 to control the first assist current of the first inverter 113-2.

The first gate signal may be generated by a preset modulation scheme. In particular, the preset modulation scheme may include at least one voltage modulation scheme among a pulse width modulation scheme, an optimal voltage modulation scheme, a triangular comparison voltage modulation scheme, and a space vector voltage modulation scheme, but without limitations thereto, may include any scheme capable of generating a gate signal for controlling the operation of the inverter.

The first controller unit 114 may include a first microcontroller unit (MCU) 114-1 but, without limitations thereto, may include any device (or computer) that may process (or execute or compute) programs.

The first controller monitoring unit 115 may be connected to the first controller unit 114. The first controller monitoring unit 115 may monitor the operation state of the first controller unit 114. For example, the first controller unit 114 may provide a first watchdog signal to the first controller monitoring unit 115. The first controller monitoring unit 115 may be cleared or generate a first reset signal based on the first watchdog signal provided from the first controller unit 114.

When the first controller monitoring unit 115 is cleared, it may mean that the first controller unit 114 is operating normally. When the first controller monitoring unit 115 generates the first reset signal and provides it to the first controller unit 114, it may mean that the first controller unit 114 is operating abnormally, and the first controller unit 114 may be reset by the first reset signal.

The first watchdog signal may be a signal where the first controller monitoring unit 115 periodically monitors the operation of the first controller unit 114 (e.g., a signal to disable reset). In other words, the first watchdog signal may be a signal capable of identifying that the program currently executed by the first controller unit 114 is alive.

The first controller monitoring unit 115 may include a first watchdog 115-1, but without limitations thereto, may include any device capable of monitoring the first controller unit 114. The first watchdog 115-1 may include a first window watchdog having a deadline, that is, a start and an end.

The first power conversion unit 116 may be connected to the power supply module. The first power conversion unit 116 may receive a first DC voltage from the power supply module. The first power conversion unit 116 may convert the first DC voltage provided from the power supply module to a voltage to generate at least one first operating voltage.

The first power conversion unit 116 may be connected to the first sensor unit 111, the first communication unit 112, the first steering motor power supply unit 113, the first controller unit 114, and the first controller monitoring unit 115. The first power conversion unit 116 may provide at least one generated first operating voltage to the first sensor unit 111, the first communication unit 112, the first steering motor power supply unit 113, the first controller unit 114, and the first controller monitoring unit 115.

The first operating voltage may be a voltage capable of operating the first sensor unit 111, the first communication unit 112, the first steering motor power supply unit 113, the first controller unit 114, and the first controller monitoring unit 115. Accordingly, there may be a plurality of first operating voltages and be modified and generated depending on the operating voltages of the first sensor unit 111, the first communication unit 112, the first steering motor power supply unit 113, the first controller unit 114, and the first controller monitoring unit 115.

The first power conversion unit 116 may include a DC-DC converter. The DC-DC converter may include a buck converter, but without limitations thereto, may include any converter capable of receiving the first DC voltage and converting it into a first operating voltage lower than the first DC voltage.

The first power conversion unit 116 may include a first regulator 116-1. The first regulator 116-1 may receive the first DC voltage and convert it into a first operating voltage lower than the received first DC voltage.

The second steering control module 120 may monitor the operation state of the first steering control module 110 controlling the reaction force motor 23 via the internal communication network 200 and, when the operation state of the first steering control module 110 is abnormal as a result of the monitoring, control the reaction force motor 23 using at least one the second sensor unit 121, the second communication unit 122, the second steering motor power supply unit 123, the second controller unit 124, the second controller monitoring unit 125, and the second power conversion unit 126. In other words, when it is determined that the first steering control module has a failure, the control right of the first steering control module may be transferred to the second steering control module.

For example, the second steering control module 120 may monitor the operation state of the first steering control module 110 currently controlling the reaction force motor 23 through the internal communication network 200 and, when the operation state of the first steering control module 110 is abnormal as a result of the monitoring, that is, when at least one of at least one of the first motor position information, the first temperature information, or the first assist current information from the first sensor unit 111, the vehicle state information from the first communication unit 112, the first assist current of the first steering motor power supply unit 113, the first gate signal of the first controller unit 114, the first watchdog signal of the first controller monitoring unit 115, or the first operating voltage of the first power conversion unit 116 is abnormal, control the reaction force motor 23 using at least one of the second sensor unit 121, the second communication unit 122, the second steering motor power supply unit 123, the second controller unit 124, the second controller monitoring unit 125, or the second power conversion unit, which perform the same functions as those of the first sensor unit 111, the first communication unit 112, the first steering motor power supply unit 113, the first controller unit 114, the first controller monitoring unit 115, and the first power conversion unit 116, that is, using at least one of at least one of the second motor position information, second temperature information, or the second assist current information from the second sensor unit 121, the vehicle state information from the second communication unit 122, the second assist current of the second steering motor power supply unit 123, the second gate signal of the second controller unit 124, the second watchdog signal of the second controller monitoring unit 125, or the second operating voltage of the second power conversion unit 126.

The first controller unit 114 may calculate the position of the rack 32 corresponding to the steering angle based on the steering angle of the steering wheel 21 received from the steering angle sensor. The calculated position of the rack 32 is not limited only to the steering angle, but may be calculated based on at least one of the torque of the above-described steering wheel 21, the first temperature information, first assist current information and first motor position information received from the first sensor unit 111, or the vehicle state received from the first communication unit 112.

Receiving the steering angle to generate the reaction force of the steering motor corresponding thereto and calculate the position of the rack corresponding to the steering angle as described above may be performed by the steering input actuator 20 and the first steering control module 110 when the host vehicle is driven in the driver mode.

In summary, in the autonomous vehicle mode, the first steering control module 110 may receive vehicle ambient information from a plurality of sensors and calculate the position of the rack according to the ambient situation of the host vehicle based on the vehicle ambient information and, in the driver mode, receive the steering angle from the steering angle sensor to calculate the position of the rack corresponding to the steering angle. The plurality of sensors may be image sensors. The image sensors may be, e.g., a radar sensor, a lidar sensor, and a camera sensor. These image sensors may be mounted on the front, side, and rear of the vehicle, and at least one or more of each may be mounted thereon.

In other words, in the autonomous vehicle mode, the first steering control module 110 which has the right to control the vehicle may receive the vehicle ambient information from the image sensors to calculate a virtual steering angle in the direction in which it intends to travel and calculate the position of the rack corresponding thereto.

Upon failing to receive the vehicle ambient information in the autonomous vehicle mode, the first steering control module 110 may output an alarm as to whether to switch to the driver mode. Specifically, if the first steering control module 110 fails to receive the vehicle ambient information, it becomes impossible to calculate the position of the rack for steering the host vehicle so that the autonomous vehicle mode may not be maintained. Accordingly, the first steering control device 10 may output an alarm to receive indication whether to switch to the driver mode. The alarm may be output through an audio-video-navigation (AVN) system equipped in the host vehicle.

Upon receiving the indication that it is impossible to switch to the driver mode, the first steering control device 10 may transfer the control right to the second steering control module 120. As described above, the second steering control module 120 may be able to perform all of the functions of the first steering control module 110. Thus, the second steering control module 120 may calculate the position of the rack based on the vehicle ambient information with the received control right.

According to those described above, when a failure occurs in the first steering control module 110 in charge of control during autonomous driving, the steering control device 10 of the disclosure may output an alarm to transfer the control right to the driver and transfer the control right to the second steering control module 120 which is redundant, thereby securing vehicle driving stability.

Upon determining that it is difficult to maintain the autonomous vehicle mode due to an issue in, e.g., the image sensor generating vehicle ambient information, the second steering control module 120 may calculate the position of the rack to perform a minimal risk condition (MRC). The MRC may mean a measure that is taken to allow the steering control device 10 to detect a risk, such as a failure while driving in the driver mode or autonomous vehicle mode to automatically pull over the host vehicle in a safe place.

Since the second steering control module 120 receives the control right as the first steering control module 110 is determined to have a failure and it is impossible to switch to the driver mode, if the second steering control module 120 cannot maintain the autonomous vehicle mode, the second steering control module 120 may determine that there is no more way to maintain driving and thus perform the MRC.

Upon failing to detect the current supplied to the reaction force motor 23 in the driver mode, the first steering control module 110 may output an alarm as to whether to switch to the autonomous vehicle mode. The current supplied to the reaction force motor may mean the above-described first assist current. In other words, since voltage for operating the reaction force motor is not supplied, it is impossible to provide an appropriate reaction force feel according to rotation of the steering wheel 21.

Upon receiving an input to maintain the driver mode, the first steering control module 110 may continue calculating the position of the rack according to the steering angle of the steering wheel 21 and transmit it to the steering output actuator 30. As described above, the driver may not have a reaction force feel according to the control of the steering wheel.

Upon receiving an indication that it is impossible to maintain the driver mode, the first steering control module 110 may switch to the autonomous vehicle mode. Accordingly, the first steering control module 110 may calculate the position of the rack based on the vehicle ambient information as described above. Upon failing to receive the vehicle ambient information, the first steering control module 110 may transfer the control right to the second steering control module 120. However, if failure to receive the vehicle ambient information is attributed to a failure or damage to the image sensor, the first steering control module 110 may calculate the position of the rack to perform the MRC, rather than transferring the control right to the second steering control module 120.

Upon failing to the steering angle of the steering wheel 21 in the driver mode, the first steering control module 110 may switch the driver mode to the autonomous vehicle mode. Upon failing to receive the steering angle, the wheels of the host vehicle are not moved in response to the rotation of the steering wheel 21 by the nature of the SbW configuration, so that a problem may occur in controlling the host vehicle. Accordingly, the first steering control module 110 may switch the driving mode immediately when a problem occurs, without outputting an alarm as to whether to switch to the autonomous vehicle mode. Upon determining that failure to receive the steering angle is attributed to an internal issue with the first steering control module 110, the first steering control module 110 may transfer the control right to the second steering control module 120. However, if the steering angle cannot be received due to, e.g., damage or failure in the steering angle sensor, the first steering control module 110 may switch the driving mode from the driver mode to the autonomous vehicle mode as described above.

According to those described above, the steering control device 10 of the disclosure may transfer the control right depending on the driving mode and faulty part in the driving vehicle corresponding to autonomous driving levels 3, 4, and 5.

The first steering control module 110 and the second steering control module 120 may be implemented as an electronic controller (ECU), a microcomputer, or the like.

In an embodiment, the first steering control module 110 and the second steering control module 120 may be implemented as an electronic control unit (ECU). The ECU may include at least one or more of one or more processors, a memory, a storage unit, a user interface input unit, or a user interface output unit which may communicate with one another via a bus. The computer system may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a steering control method using the steering control device 10 capable of performing the above-described embodiments of the disclosure.

Figure 4:
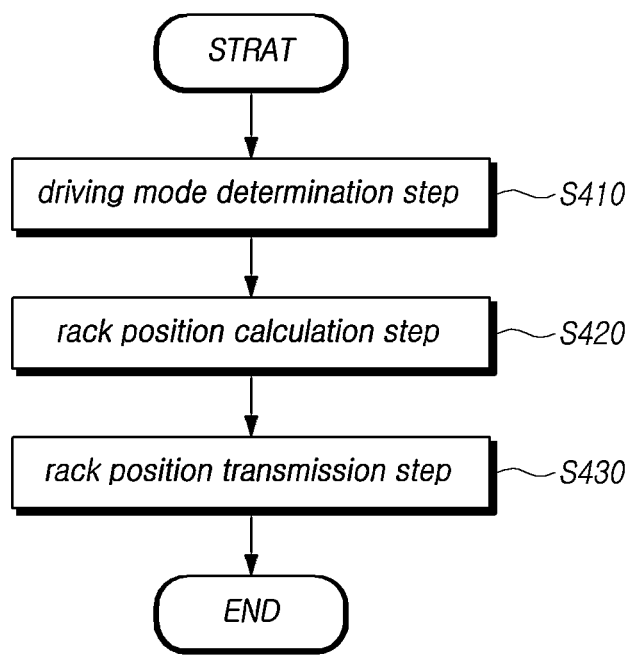
FIG. 4 is a flowchart illustrating a steering control method according to an embodiment of the disclosure.

FIG. 4 is a flowchart illustrating a steering control method according to an embodiment of the disclosure.

Referring to FIG. 4, a steering control method according to the disclosure may comprise a driving mode determination step S410 determining a driving mode in which a host vehicle is driving, a rack position calculation step S420 receiving a steering angle of a steering wheel from a steering angle sensor to calculate a position of a rack corresponding to the steering angle when the host vehicle is driving in a driver mode and, when the host vehicle is driving in an autonomous vehicle mode, receiving vehicle ambient information from a plurality of sensors to calculate the position of the rack according to an ambient context of the host vehicle based on the vehicle ambient information and, upon determining that a first steering control module calculating the position of the rack has a failure, transferring a control right for the first steering control module to a second steering control module, and a rack position transmission step S430 transmitting the calculated position of the rack to a road wheel actuator (RWA).

Figure 5:
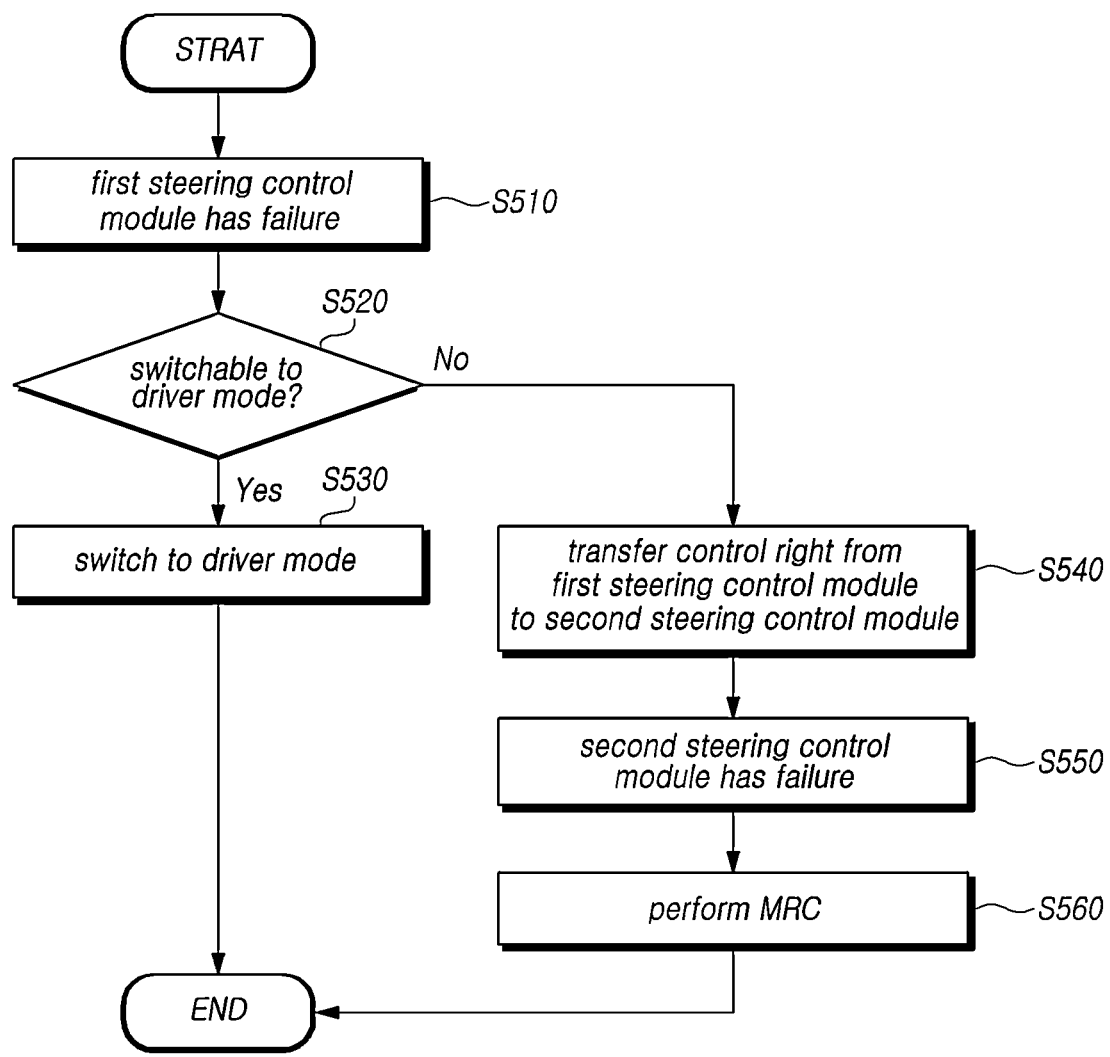
FIG. 5 is a flowchart illustrating, in greater detail, step S420 in an autonomous vehicle mode according to an embodiment.

FIG. 5 is a flowchart illustrating, in greater detail, step S420 in an autonomous vehicle mode according to an embodiment.

The steering control device 10 may detect a failure in the first steering control module 110 malfunctions while driving in the autonomous vehicle mode (S510). Specifically, as described above, the first steering control module 110 and the second steering control module 120 may determine each other's states through the internal communication network 300, and a failure in the first steering control module 110 may be detected by the first steering control module 110 itself and be detected by the second steering control module 120.

The steering control device 10 may output an alarm as to whether to switch to the driver mode (S520). As described above, the alarm for receiving the indication as to whether to switch modes may be output through the AVN system.

Upon receiving an indication that switch to the driver mode is possible (yes in S520), the steering control device 10 may switch the driving mode of the host vehicle to the driver mode, receive the steering angle according to the rotation of the steering wheel 21, calculate the position of the rack corresponding thereto, and transmit it to the steering output actuator 30 (S530).

Upon receiving an indication that switch to the driver mode is impossible (no in S520), the steering control device 10 may transfer the control right from the first steering control module 110 to the second steering control module 120 (S540). Accordingly, the second steering control module 120 may receive the vehicle ambient information and calculate the position of the rack based on the vehicle ambient information.

The steering control device 10 may detect an occurrence of a failure in the second steering control module 120 (S550). In this case, there is no entity to properly execute the control right for the host vehicle. Thus, the steering control device 10 may calculate the position of the rack to perform the MRC (S560).

Figure 6:
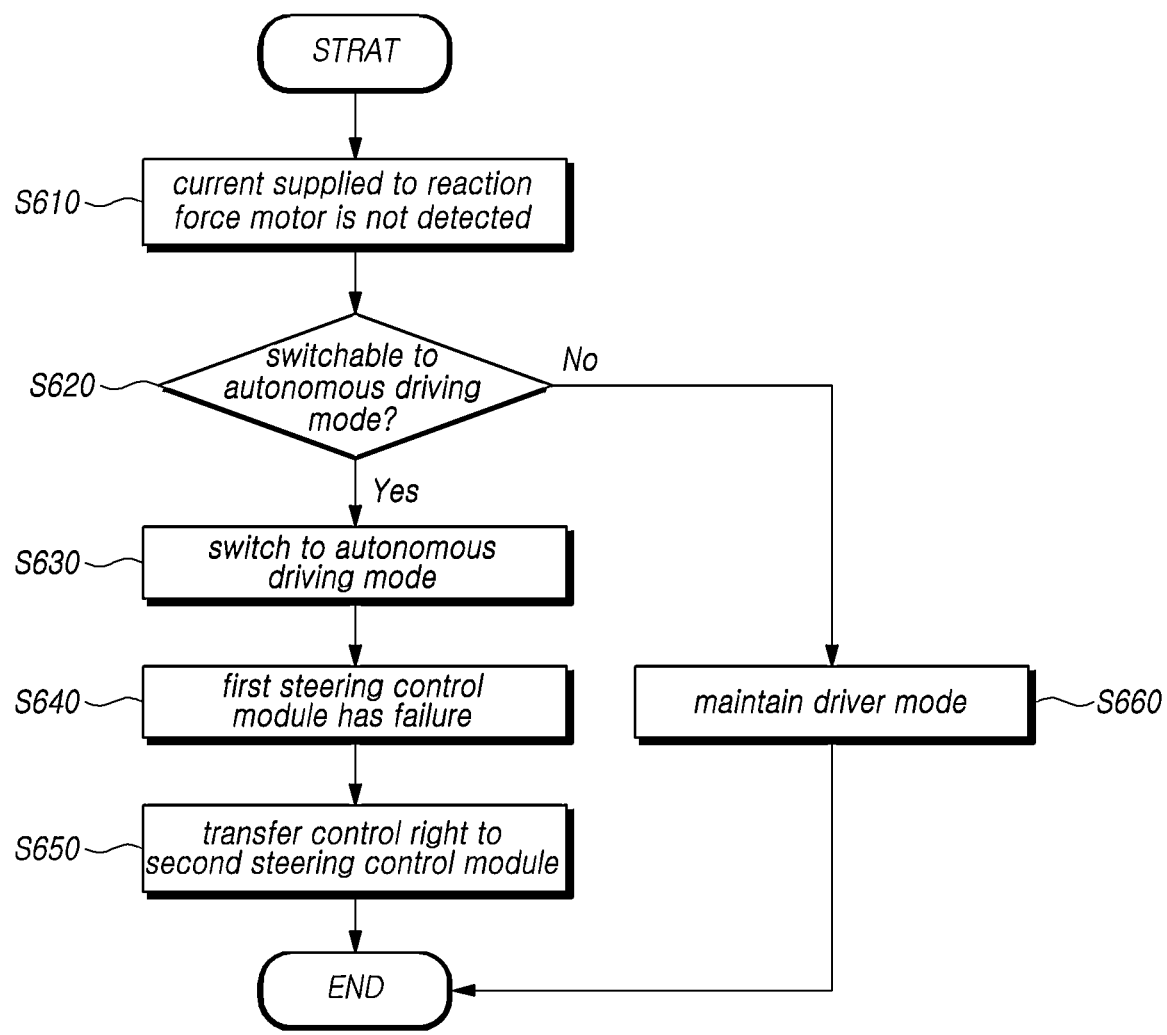
FIG. 6 is a flowchart illustrating, in greater detail, step S420 in a driver mode according to an embodiment.

FIG. 6 is a flowchart illustrating, in greater detail, step S420 in a driver mode according to an embodiment.

The steering control device 10 may identify that the current supplied to the reaction force motor 23 is not detected while driving in the driver mode (S610).

As the reaction force motor 23 does not operate, a reaction force according to the rotation of the steering wheel 21 is not supplied. Therefore, the steering control device 10 may determine that a problem may occur in the safety of the driver and may output an alarm as to whether to switch to the autonomous vehicle mode (S620).

Upon receiving an input to switch to the autonomous vehicle mode (yes in S620), the steering control device 10 may switch the driving mode to the autonomous vehicle mode (S630). By switching to the autonomous vehicle mode, it is not necessary to provide a sense of reaction force according to the rotation of the steering 21, so that the driver's safety may be secured.

The steering control device 10 may detect an occurrence of a failure in the first steering control module 110 (S640).

Since the steering control device 10 is unable to switch to the driver mode, the steering control device 10 may transfer the control right from the first steering control module 110 to the second steering control module 120. As it is determined that performing MRC is impossible due to a failure in the second steering control module 120 as well, the steering control device 10 may output an alarm to switch to the driver mode where no reaction force is provided to the steering wheel 21.

Upon receiving an input not to switch to the autonomous vehicle mode (no in S620), the steering control device 10 may maintain the driver mode and calculate the position of the rack according to the steering angle of steering wheel without providing reaction force against the rotation of the steering wheel 21 (S660).

Figure 7:
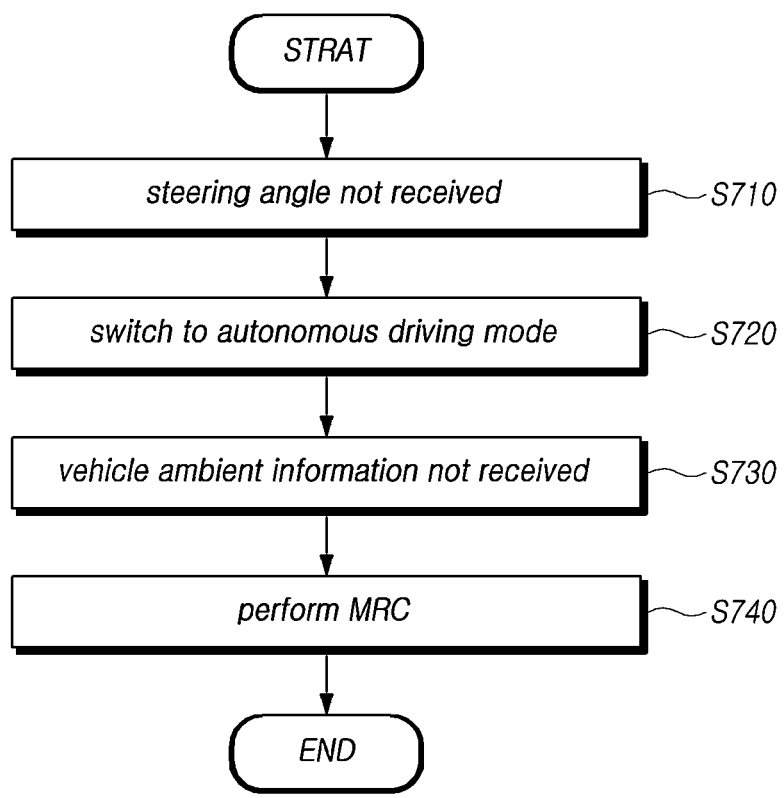
FIG. 7 is a flowchart illustrating, in greater detail, step S420 in a driver mode according to another embodiment.

FIG. 7 is a flowchart illustrating, in greater detail, step S420 in a driver mode according to another embodiment.

Referring to FIG. 7, the steering control device 10 may detect failure to receive the steering angle of the steering wheel 21 from the steering angle sensor in the driver mode (S710). If the steering angle is not received, the position of the rack for steering the vehicle cannot be calculated.

Accordingly, the steering control device 10 may switch to the autonomous vehicle mode (S720). Unlike in the previous context, since the steering angle is not received, an alarm as to whether to switch to the autonomous vehicle mode may not be output.

The steering control device 10 may detect failure to receive vehicle ambient information (S730). As described above, since the vehicle ambient information is not received, the position of the rack cannot be calculated thereby, so that the steering control device may abnormally perform autonomous driving.

Accordingly, the steering control device 10 may calculate the position of the rack to perform the MRC.

Failure to receive the vehicle ambient information as described above is merely an example in which the autonomous vehicle mode is not maintained, and the condition is not the only one to perform the MRC. For example, an occurrence of an issue with the vehicle itself, such as when the wheel 33 is not moved according to the position of the rack or when the host vehicle does not brake, may also be a condition to perform the MRC.

As described above, according to the disclosure, the steering control device and method may transfer the control right to maintain driving according to the context or cause of a failure in autonomous driving level 3, 4, and 5 level vehicles which require the driver's steering, thereby securing driving safety.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering control device, comprising:
a first steering control module receiving a steering angle of a steering wheel from a steering angle sensor, calculating a position of a rack corresponding to the steering angle, and transmitting the position of the rack to a road wheel actuator (RWA); and
a second steering control module to which a control right for the first steering control module is transferred when the first steering control module is determined to have a failure,
wherein the first steering control module receives, in an autonomous vehicle mode, vehicle ambient information from a plurality of sensors and calculates the position of the rack according to an ambient context of a host vehicle based on the vehicle ambient information and, in a driving mode, receives the steering angle from the steering angle sensor and calculates the position of the rack corresponding to the steering angle.

2. The steering control device of claim 1, wherein the first steering control module outputs an alarm as to whether to switch to the driver mode upon failing to receive the vehicle ambient information in the autonomous vehicle mode.

3. The steering control device of claim 2, wherein the first steering control module transfers the control right to the second steering control module upon receiving an indication that it is impossible to switch to the driver mode.

4. The steering control device of claim 3, wherein the second steering control module calculates the position of the rack to perform a minimal risk condition (MRC) upon determining that it is difficult to maintain the autonomous vehicle mode.

5. The steering control device of claim 1, wherein the first steering control module outputs an alarm as to whether to switch to the autonomous vehicle mode upon failing to detect a current supplied to a reaction force motor in the driver mode.

6. The steering control device of claim 5, wherein the first steering control module switches to the autonomous vehicle mode upon receiving an indication that it is impossible to maintain the driver mode.

7. The steering control device of claim 6, wherein the first steering control module calculates the position of the rack to perform an MRC upon failing to receive the vehicle ambient information.

8. The steering control device of claim 1, wherein the first steering control module switches the driver mode to the autonomous vehicle mode upon failing to receive the steering angle in the driver mode.

9. A steering control method, comprising:
a driving mode determination step determining a driving mode in which a host vehicle is driving;
a rack position calculation step receiving a steering angle of a steering wheel from a steering angle sensor to calculate a position of a rack corresponding to the steering angle when the host vehicle is driving in a driver mode and, when the host vehicle is driving in an autonomous vehicle mode, receiving vehicle ambient information from a plurality of sensors to calculate the position of the rack according to an ambient context of the host vehicle based on the vehicle ambient information and, upon determining that a first steering control module calculating the position of the rack has a failure, transferring a control right for the first steering control module to a second steering control module; and a rack position transmission step transmitting the calculated position of the rack to a road wheel actuator (RWA).

10. The steering control method of claim 9, wherein the rack position calculation step outputs an alarm as to whether to switch to the driver mode upon failing to receive the vehicle ambient information in the autonomous vehicle mode.

11. The steering control method of claim 10, wherein the rack position calculation step transfers the control right to the second steering control module upon receiving an indication that it is impossible to switch to the driver mode.

12. The steering control method of claim 11, wherein the rack position calculation step calculates the position of the rack to perform a minimal risk condition (MRC) upon determining that it is difficult to maintain the autonomous vehicle mode.

13. The steering control method of claim 9, wherein the rack position calculation step outputs an alarm as to whether to switch to the autonomous vehicle mode upon failing to detect a current flowing to a reaction force motor in the driver mode.

14. The steering control method of claim 13, wherein the rack position calculation step switches to the autonomous vehicle mode upon receiving an indication that it is impossible to maintain the driver mode.

15. The steering control method of claim 14, wherein the rack position calculation step calculates the position of the rack to perform an MRC upon failing to receive the vehicle ambient information.

16. The steering control method of claim 9, wherein the first steering control module switches the driver mode to the autonomous vehicle mode upon failing to receive the steering angle in the driver mode.

* * * * *